(12) United States Patent
Akiyama et al.

(10) Patent No.: US 7,060,371 B2
(45) Date of Patent: Jun. 13, 2006

(54) MECHANOLUMINESCENCE MATERIAL, PRODUCING METHOD THEREOF, AND USAGE THEREOF

(75) Inventors: Morito Akiyama, Tosu (JP); Chao-Nan Xu, Tosu (JP); Kazuhiro Nonaka, Tosu (JP)

(73) Assignee: National Institute of Advanced Industrial Science & Technology, Tokyo (JP)

( * ) Notice: Subject to any disclaimer, the term of this patent is extended or adjusted under 35 U.S.C. 154(b) by 203 days.

(21) Appl. No.: 10/301,814

(22) Filed: Nov. 22, 2002

(65) Prior Publication Data

US 2003/0124383 A1 Jul. 3, 2003

(30) Foreign Application Priority Data

Nov. 30, 2001 (JP) .............................. 2001-367297

(51) Int. Cl.
*C09K 11/08* (2006.01)

(52) U.S. Cl. .................... 428/690; 428/917; 252/301.4; 252/301.4 R; 264/21

(58) Field of Classification Search ................ 428/690, 428/917; 252/301.4, 301.4 F, 301.6 F, 301.4 R; 313/503, 504, 506, 509; 106/52
See application file for complete search history.

(56) References Cited

U.S. PATENT DOCUMENTS

| | | | | |
|---|---|---|---|---|
| 3,732,416 A | * | 5/1973 | Audesse et al. | ............ 362/260 |
| 3,858,082 A | * | 12/1974 | Thornton, Jr. | ............... 313/487 |
| 3,897,359 A | * | 7/1975 | Kobayashi et al. | ... 252/301.4 F |
| 3,928,229 A | * | 12/1975 | Neuroth | ................ 252/301.6 P |
| 4,208,448 A | * | 6/1980 | Panaccione | ................... 427/67 |
| 4,990,282 A | * | 2/1991 | Bryan et al. | .......... 252/301.4 F |
| 5,194,332 A | * | 3/1993 | Kasenga et al. | ............. 428/402 |
| 5,479,070 A | * | 12/1995 | Murakami | ................... 313/499 |
| 5,788,882 A | * | 8/1998 | Kitai et al. | ............ 252/301.4 R |
| 6,168,729 B1 | * | 1/2001 | Toki et al. | ............. 252/301.4 R |
| 6,197,218 B1 | * | 3/2001 | Hampden-Smith et al. | ................... 252/301.4 R |
| 6,356,699 B1 | * | 3/2002 | Bartholomew et al. | ..... 385/142 |
| 6,429,583 B1 | * | 8/2002 | Levinson et al. | ........... 313/503 |
| 6,809,781 B1 | * | 10/2004 | Setlur et al. | .................. 349/70 |
| 2002/0086190 A1 | | 7/2002 | Miyaura | |

FOREIGN PATENT DOCUMENTS

JP 2000-313878 11/2000
JP 2001-49251 2/2001

OTHER PUBLICATIONS

Communication From European Patent Office Dated Mar. 21, 2003 With European Search Report Attached.
Applied Physics Letters, vol. 75, No. 17, pp. 2548-2550, Oct. 25, 1999; "Recovery Phenomenon of Mechanoluminescence From $Ca_2Al_2SiO_7$:Ce by Irradiation With Ultraviolet Light" by Morito Akiyama, et al.

(Continued)

*Primary Examiner*—Rena Dye
*Assistant Examiner*—Camie S. Thompson
(74) *Attorney, Agent, or Firm*—Nixon & Vanderhye P.C.

(57) ABSTRACT

A mechanoluminescence material comprising a mother body material and a luminescence center added to the mother body material. The mother body material is constituted of at least one kind of oxide selected from alumino silicate, aluminate, silicate, tantalate, niobate, gallium oxide, and $ZrO_2$, and the luminescence center is at least one kind selected from a rare earth metal and a transition metal which emits light when electrons excited by mechanical energy are restored to a normal state.

4 Claims, 1 Drawing Sheet

OTHER PUBLICATIONS

Jpn. J. Appl. Phys. vol. 39 (2000) pp. 6582-6586, Part 1, No. 12A, Dec. 2000; "Strong Mechanoluminescence From UV-Irradiated Spinels of $ZnGa_2O_4$:Mn and $MgGa_2O_4$:Mn" by Hiroaki Matsui et al.

Applied Physics Letters, vol. 74, No. 17; pp. 2414-2416, Apr. 26, 1999; "Direct View of Stress Distribution in Solid by Mechanoluminescence" by Chao-Nan Xu et al.

Journal of Alloys and Compounds 311 (2000) pp. 159-168; "Luminescence Properties of the Layered Niobate $KCa_2Nb_3O_{10}$ Doped With $Eu^{3+}$ And $La^{3+}$ Ions" by Marcos A. Bizeto et al.

Journal of Alloys and Compounds 323-324 (2001) pp. 273-278; "The Up-Conversion Processes in $Ho^{3+}$ Doped $LiTaO_3$" by I. Sokólska et al.

Journal of Alloys and Compounds 300-301 (2000) pp. 152-157; "Investigation of $LiXO_3$ (X=Nb, Ta) Crystals Doped With Luminescent Ions Recent Results" by W. Ryba-Romanowski et al.

* cited by examiner

MECHANOLUMINESCENCE MATERIAL, PRODUCING METHOD THEREOF, AND USAGE THEREOF

FIELD OF THE INVENTION

The present invention relates to a so-called mechanoluminescence material that emits light by receiving mechanical force from outside, a producing method thereof, and usage thereof.

BACKGROUND OF THE INVENTION

Conventionally, it has been well known that: there is a material, emitting visible or substantially visible light at a low temperature such as a room temperature by receiving external stimulation, which functions as a so-called fluorescent phenomenon. Materials bringing about such a fluorescent phenomenon, namely fluorescent materials, are used in a panel light such as a fluorescent lamp and in a display such as a so-called Braun tube of CRT (Cathode Ray Tube).

It is typical that ultraviolet ray irradiation, electron ray irradiation, X-ray irradiation, radioactive ray irradiation, application of an electric field, chemical reaction, and the like are performed as external stimulation bringing about the fluorescent phenomenon, but a material that emits light by receiving mechanical force from outside is not well known.

The present inventors proposed the following two light-emitting materials. The one is a high intensity mechanoluminescence material (Japanese Unexamined Patent Publication No. 49251/2001 (Tokukai 2001-49251)(Publication date: Feb. 20, 2001)) made of (a) a material, constituted of at least one kind of aluminate having non-stoicheiometric composition, that includes lattice defect in which light is emitted when carriers excited by mechanical energy are restored to a normal state, or (b) a material whose mother body material includes at least one kind of a metal ion selected from a rare earth metal ion and a transition metal ion as a central ion of a luminescence center. The other is a light-emitting material (Japanese Unexamined Patent Publication No. 313878/2000 (Tokukai 2000-313878)(Publication date: Nov. 14, 2000)) whose mother body material is constituted of $Y_2SiO_5$, $Ba_3MgSi_2O_8$, and $BaSi_2O_5$. However, these light-emitting materials are so insufficient in the luminous intensity that they cannot be put into practical usage. Thus, a material whose luminous intensity is higher has been required.

SUMMARY OF THE INVENTION

As a result of earnest study performed by the present inventors so as to develop a mechanoluminescence material having higher luminescence intensity, they found that: when a certain kind selected from alumino silicate, aluminate, silicate, tantalate, niobate, gallium oxide, and zirconium dioxide is used so as to produce a mother body material, it is possible to obtain a mechanoluminescence material whose luminescence intensity is high. As a result, they completed the present invention.

That is, the mechanoluminescence material of the present invention includes: a mother body material; and a luminescence center added to the mother body material, wherein: said mother body material is constituted of at least one kind of oxide selected from:

alumino silicate having a structure indicated by a general formula (A)

$$xM^1O \cdot yAl_2O_3 \cdot zSiO_2$$

($M^1$ in the formula is Ca, Ba or Sr, and a part thereof may be replaced with at least one kind selected from Na, K, and Mg, and each of x, y, and z is 1 or more);

aluminate having a structure indicated by a general formula (B)

$$xM^3O \cdot y\ Al_2O_3$$

($M^3$ in the formula is Ca or Ba, and a part thereof may be replaced with either Mg or La, and each of x and y is 1 or more);

silicate having a structure indicated by a general formula (C)

$$xM^3O \cdot ySiO_2$$

($M^3$ in the formula is Ca or Sr, and a part thereof may be replaced with at least one kind selected from Na, Mg, Zn, Be, Mn, Zr, Ce, and Nb, and each of x and y is 1 or more), or indicated by $Ba_2\ Mg\ SiO_7$;

tantalate or niobate having a structure indicated by a general formula (D)

$$xM^4O \cdot yM^5_4O_{10}$$

($M^4$ in the formula is Ca, Ba or Sr, and $M^5$ is replaced with at least one kind selected from Ta and Nb, and each of x and y is 1 or more); and gallium oxide having a structure indicated by a general formula (E)

$$xM^6O \cdot yGa_2O_3$$

($M^6$ in the formula is Ca, Ba or Sr, and a part thereof may be replaced with La, and each of x and y is 1 or more); and said luminescence center is at least one kind selected from a rare earth metal and a transition metal which emits light when electrons excited by mechanical energy are restored to a normal state.

According to the arrangement, it is possible to obtain the mechanoluminescence material which functions as a novel high intensity mechanoluminescence material which emits light by receiving a mechanical force from outside such as a frictional force, a shearing force, an impulse force, a pressure, and a tensile force. Further, action of the mechanical force applied from outside can be directly converted into light so as to emit light, so that the mechanoluminescence material can be widely utilized as a completely novel optical element.

For a fuller understanding of the nature and advantages of the invention, reference should be made to the ensuing detailed description taken in conjunction with the accompanying drawings.

DESCRIPTION OF THE EMBODIMENTS

Figure 1:
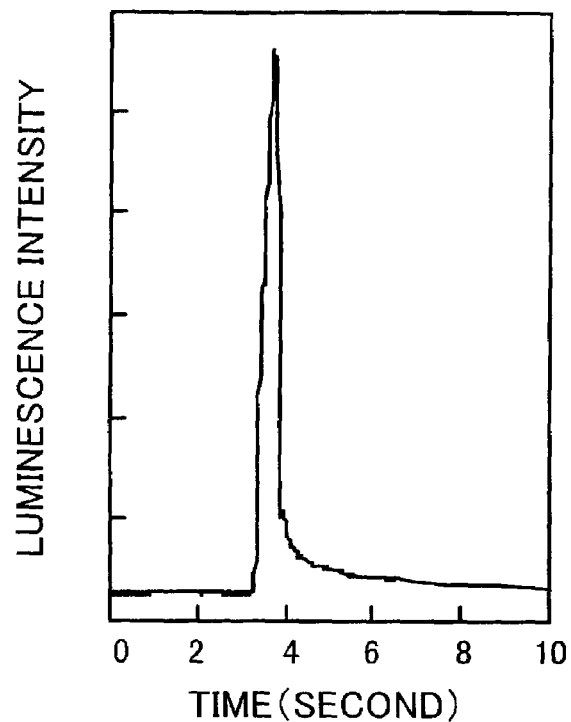
FIG. 1 is a graph showing how light is emitted according to stress in a case where mechanical force is applied to a sample in the form of pellet described in Example 1.

One embodiment of the present invention is described as follows.

The mechanoluminescence material of the present invention is arranged so that a mother body material thereof includes a luminescence center. As the mother body material, an oxide selected from the aforementioned (A) through (E) groups and $ZrO_2$ is used. Note that, in a case where parts of $M_1$ to $M_3$ and $M_6$ shown in the aforementioned (A) through (C) and (E) groups are replaced with other elements described above, the replacement of the elements is performed so as to have a stoicheiometric composition corresponding to an atomic value thereof.

Examples of alumino silicate, belonging to the aforementioned (A) group, that functions as the mother body material, include:

(Ca, Na)(Mg, Fe, Al, Ti)(Si, Al)$_2$O$_6$,
(Ca, Na)$_2$(Al, Mg, Fe)(Si, Ai)$_2$O$_7$,
(Ca, Na$_2$)Al$_2$Si$_4$O$_{12}$,
(K$_2$, Ca, Mg, Na$_2$)$_2$Al$_4$Si$_{14}$O$_{36}$,
(K$_2$, Sr, Mg, Na$_2$)$_2$Al$_4$Si$_{14}$O$_{36}$,
(Na, Ca)Al(Al, Si)$_2$SiO$_8$,
(Na, Sr)Al(Al, Si)$_2$SiO$_8$,
(Sr, K$_2$, Na$_2$)Al$_4$Si$_{14}$O$_{36}$,
(Sr, Na)(Mg, Fe, Al, Ti)(Si, Al)$_2$O$_6$,
(Sr, Na)$_2$(Al, Mg, Fe)(Si, Al)$_2$O$_7$,
Ba$_2$(Mg, Al)(Al, Si)SiO$_7$,
Ba$_2$Al$_2$SiO$_7$,
BaAl$_2$Si$_2$O$_8$,
BaNaAlSi$_2$O$_7$,
Ca$_2$(Mg, Al)(Al, Si)SiO$_7$,
CaAl$_2$SiO$_8$,
CaNa$_2$Al$_4$Si$_4$O$_{16}$,
Sr$_2$(Mg, Al)(Al, Si)SiO$_7$,
Sr$_2$Al$_2$SiO$_7$,
SrNa$_2$Al$_4$Si$_4$O$_6$, and the like.

The elements in parentheses can be partially or entirely replaced with each other. That is, as to the elements in parentheses of the aforementioned chemical formula, any one of the elements in parentheses may be used, or two or more elements may be used at an arbitrary rate.

Note that, the alumino silicate may further include elements that are not included in a general formula $xM_1O \cdot yAl_2O_3 \cdot zSiO_2$ shown as the mother body material belonging to the aforementioned (A) group. That is, as shown by the foregoing chemical formula, the alumino silicate may include Fe, Ti, and the like as oxide.

Further, examples of aluminate that functions as the mother body material belonging to the aforementioned (B) group include:

BaAl$_8$O$_{13}$,
BaMgAl$_6$O$_{11}$,
CaLaAl$_3$O$_7$,
CaMgAl$_6$O$_{11}$, and the like.

Further, examples of silicate which functions as the mother body material belonging to the aforementioned (C) group include:

Ba(Zn, Mn, Fe, Mg)Si$_2$O$_6$,
Ba$_2$(Mg, Fe)Si$_2$O$_7$,
Ba$_2$BeSi$_2$O$_7$,
Ba$_2$MgSi$_2$O$_7$,
Ca$_2$BeSi$_2$O$_7$,
CaMgSi$_2$O$_6$,
CaMnSi$_2$O$_6$,
CaZrSi$_2$O,
Sr(Zn, Mn, Fe, Mg)Si$_2$O$_6$,
Sr$_2$(Mg, Fe)Si$_2$O$_7$,
Sr$_2$B$_2$SiO$_7$,
Sr$_2$BeSi$_2$O$_7$,
Sr$_2$MgSi$_2$O$_7$,
Sr$_2$Na$_4$CeFeNb$_2$Si$_8$O$_{28}$,
Sr$_3$Si$_2$O$_7$,
SrFeSi$_2$O$_6$,
SrMgSi$_2$O$_6$, and the like. Note that, as to the elements in parentheses, the replacement can be performed as described above. Further, the silicate may further include elements that are not included in a general formula $xM_1O \cdot ySiO_2$ shown as the mother body material belonging to the aforementioned (C) group. That is, as shown by the foregoing chemical formula, the silicate may include B, Fe, Ti, and the like as oxide.

Further, examples of tantalate or niobate which functions as the mother body material belonging to the aforementioned (D) group include:

Sr(Ta, Nb)$_4$O$_{11}$.

Further, examples of the aforementioned (E) group include:

SrGa$_{12}$O$_{19}$, and
SrLaGa$_3$O$_7$.

In a case where the mother body materials are used as the mechanoluminescence material, it is possible to obtain particularly high luminescence intensity by using (Ca, Na)$_2$(Al, Mg, Fe)(Si, Al)$_2$O$_7$, Ba$_2$Al$_2$SiO$_7$, Ba$_2$MgSi$_2$O$_7$, BaAl$_2$Si$_2$O$_8$, BaAl$_8$O$_{13}$, Ca$_2$(Mg, Al)(Al, Si)SiO$_7$, Sr(Ta, Nb)$_4$O$_{11}$, Sr(Zn, Mn, Fe, Mg)Si$_2$O$_6$, Sr$_2$(Mg, Al)(Al, Si)SiO$_7$, Sr$_2$Al$_2$SiO$_7$, Sr$_2$MgSi$_2$O$_7$, Sr$_2$Na$_4$CeFeNb$_2$Si$_8$O$_{28}$, SrMgSi$_2$O$_6$, and ZrO$_2$.

Note that, the mother body materials belong to a crystal group indicated by the following point group in terms of a crystal structure.

1, $\bar{1}$, 2, 2/m, 6/m, m3m, $\bar{4}$2m, 622

The luminescence center added to the mother body material emits light when electrons excited by mechanical energy are restored to a normal state, and is constituted by combining (a) one kind or two or more kinds selected from the rare earth metal group with (b) one kind or two or more kinds selected from the transition metal group. The luminescence center is added to the mother body material, so that it is possible to obtain the mechanoluminescence material whose luminescence intensity is extremely improved. In this manner, the rare earth metal group and the transition metal group are used to extremely improve the luminescence intensity of the mechanoluminescence material, so that it is preferable to use the rare earth metal group and the transition metal group whose first energy of ionization is not more than 8 eV, particularly not more than 6 eV.

Concretely, the rare earth metal group and the transition metal group have unstable electron shells of 3d, 4d, 5d, or 4f. That is, examples of the rare earth metal include Sc, Y, La, Ce, Pr, Nd, Pm, Sm, Eu, Gd, Tb, Dy, Ho, Er, Tm, Yb, Lu, and the like. Further, examples of the transition metal include Ti, Zr, V, Cr, Mn, Fe, Co, Ni, Cu, Zn, Nb, Mo, Ta, W, and the like.

Preferable transition metals of the foregoing transition metal group having an unstable 3d electron shell are Ti, V, Cr, Mn, Fe, Co, Ni, Cu, and the like. Further, preferable transition metals of the foregoing transition metal group having an unstable 4d electron shell are Nb and Mo. Preferable transition metals of the foregoing transition metal group having an unstable 5d electron shell are Ta and W. Meanwhile, preferable rare earth metals of the foregoing rare earth metal group having an unstable 4f electron shell are Ce, Pr, Nd, Pm, Sm, Eu, Gd, Tb, Dy, and the like.

A certain metal is selected from the rare earth metal group and the transition metal group as a preferable luminescence center, and which metal is preferable is determined depending on which mother body material is to be used. That is, the luminescence intensity and the most preferable luminescence center of the obtained mechanoluminescence material differ in accordance with combination of the mother body material and the luminescence center. Thus, it is preferable to select the luminescence center to be added in accordance with the mother body material to be used as required. Concretely, it is preferable to use Eu as the luminescence center in a case where $Sr_2Al_2SiO_7$ or $Sr_2MgSi_2O_7$ are used as the mother body material for example, and it is preferable to use Ti as the luminescence center in a case where $ZrO_2$ is used as the mother body material.

Next, a producing method of the mechanoluminescence material of the present invention is described. The mechanoluminescence material of the present invention is produced by doping the rare earth metal and the transition metal each of which functions as the luminescence center on the aforementioned mother body material. Concretely, after mixing the mother body material and the rare earth metal and the transition metal each of which functions as the luminescence center, the resultant is sintered at a high temperature ranging from 600° C. to 1800° C. in a reduction atmosphere for at least 30 minutes, so that the mechanoluminescence material is obtained. If the sintering is performed after a flux such as boric acid has been added, the luminescence property of the obtained mechanoluminescence material is further improved.

Note that, it is possible to dope the rare earth metal and the transition metal on the mother body material by using the rare earth metal and the transition metal as simple substances, or by using a compound of the rare earth metal and a compound of the transition metal. Examples of the compound of the rare earth metal and the compound of the transition metal include: oxide, nitrate, and the like of the rare earth metal and the transition metal.

Further, an amount of the added rare earth metal and transition metal each of which functions as the luminescence center is set to be within 0.001 to 20 mass % with respect to the mother body material. This is based on the following reason: when the amount of the added luminescence center is less than 0.001 mass %, sufficient luminescence intensity cannot be obtained, and when the amount of the added luminescence center is more than 20 mass %, the crystal structure of the mother body material cannot be maintained, so that the luminescence efficiency declines. As a result, this is hard to use as the mechanoluminescence material.

The mechanoluminescence material of the present invention emits light when it receives a mechanical force applied from outside. Although the mechanical force is not particularly limited, examples of the mechanical force applied from outside include: a mechanical force such as a frictional force, a shearing force, an impulse force, a pressure, and a tensile force.

Although the luminescence intensity of the mechanoluminescence material depends on how the mechanical force which functions as an exciting source exerts influence, it is typical that: the more mechanical force is applied, the higher the luminescence intensity becomes. Thus, the luminescence intensity is measured, so that it is possible to know how much mechanical force is applied to the mechanoluminescence material. Thus, it is possible to detect, without touching the mechanoluminescence material, how much it is stressed, and it is also possible to visualize a condition under which it is stressed. Thus, the mechanoluminescence material is expected to be applied to a stress detector and other various fields.

Further, the mechanoluminescence material of the present invention is combined with other inorganic material or organic material except the mechanoluminescence material so as to constitute a composite material, and the mechanical force is applied from outside to the composite material, so that it is possible to cause the composite material to emit light. When, for example, the mechanoluminescence material is mixed with or put into an organic material such as resin and plastic at an arbitrary ratio so as to constitute the composite material, and the mechanical force is applied from outside to the composite material, the mechanoluminescence material is deformed so as to emit light. Alternately, glass and glass fiber may be used as the inorganic material in constituting the composite material so as to cause the mechanoluminescence material to emit light.

Alternately, a base material such as a heat-resisting base material may be used as other inorganic or organic material described above after providing the mechanoluminescence material thereon. That is, the mechanoluminescence material may be used as a coating film provided on a surface of the base material such as the heat-resisting base material. Note that, hereinbelow, the composite material, in which the mechanoluminescence material is used as the coating film provided on the surface of the heat-resisting base material, is referred to as a stacked material. When the mechanical force is applied from outside to the stacked material, the mechanoluminescence material layer provided on the surface of the base material is deformed so as to emit light. Thus, according to the stacked material of the present invention, it is possible to obtain light emission of a large area using a small quantity of the mechanoluminescence material.

In order to obtain the foregoing stacked material, a material compound that can constitute a predetermined mother body material is dissolved in dissolvent. Further, at least one kind of the luminescence center selected from the rare earth metal and the transition metal is added to the resultant so as to prepare an embrocation. Then, the embrocation is applied to the surface of the base material. Thereafter, the base material to which the embrocation has been applied is sintered, so that it is possible to form the stacked material in which the mechanoluminescence material is provided on the surface of the base material as the coating film.

Note that, examples of the material compound that can form the mother body material include: nitrate, halogenide, an alkoxy compound, and the like.

Further, it is preferable that the base material is the heat-resisting base material so as to sinter it upon providing the mechanoluminescence material on the surface thereof. Although the heat-resisting base material is not particularly limited, it is preferable to use the following materials for example: quartz; silicon; graphite; heat-resistance glass such as quartz glass and vycor glass; ceramics such as alumina, silicon nitride, silicon carbide, and molybdenum disilicide; a heat resisting steel such as a stainless steel; a heat resisting iron or a heat resisting alloy such as nickel, chromium, titanium, and molybdenum; cermet; cement; concrete; and the like.

Next, the present invention is further detailed based on the following Examples. However, the present invention is not necessarily limited to these Examples.

EXAMPLE 1

$Sr_2Al_2SiO_7$ in the form of powder was used as the mother body material, and $Eu_2O_3$ which functioned as the luminescence center was added to the mother body material so that an amount of $Eu_2O_3$ was 0.05 mass % with respect to the mother body material. Further, boric acid which functioned as a flux was added to and mixed with the mother body material so that an amount of the boric acid was 10 mass % with respect to the resultant. The mixture was sintered at 1300° C. for four hours in an argon atmosphere containing 2.5 mass % hydrogen, so as to prepare a sintered compact of the mechanoluminescence material.

Next, the sintered compact that had been obtained was crushed into powder. 20 mass parts of the powder were put into 100 mass parts epoxy resin (trade name: Specifics-40, made by Struers Co., Ltd.) so as to prepare a sample in the form of pellet (hereinbelow, referred to as pellet sample).

A mechanical force of 1000N was applied, using a vise, to the pellet sample ($Sr_2Al_2SiO_7$: Eu) obtained in the foregoing manner. FIG. 1 shows how the luminescence intensity brought about by the application of the mechanical force varies with time. Note that, the pellet sample emitted blue light so intensely that it could be perceived with an unaided eye.

Figure 2:
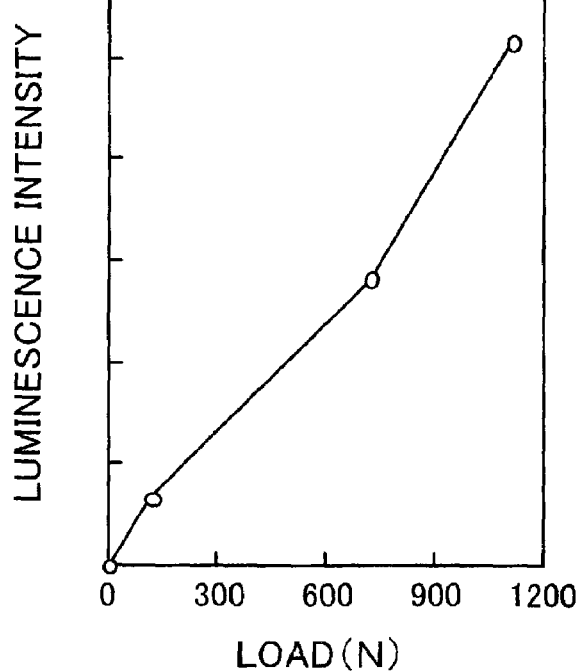
FIG. 2 is a graph showing how the luminescence intensity of the sample in the form of pellet described in Example 1 depends on stress.

Further, FIG. 2 is a graph showing how the luminescence intensity of the pellet sample ($Sr_2Al_2SiO_7$: Eu) depends on the stress. According to the graph, it was found that: the luminescence intensity of the pellet sample depends on the stress, and the luminescence intensity increases as the load is applied more. Thus, it was found that: it is possible to evaluate the largeness of the applied stress by measuring the luminescence intensity.

EXAMPLE 2

The pellet samples of the mechanoluminescence material having the mother body material and the luminescence center shown in Table 1 was prepared in the same manner as in Example 1, and the luminescence intensity (cps) of each pellet sample was measured. Table 1 shows results of the measurement.

TABLE 1

| SAMPLE No. | COMPOSITION | LUMINESCENCE INTENSITY (cps) |
|---|---|---|
| 1 | $Ca\ La\ Al_3\ O_7$: Ce | 4912 |
| 2 | $Ca\ La\ Al_3\ O_7$: Eu | 4376 |
| 3 | $Sr_2\ Al_2\ SiO_7$: Ce | 28712 |
| 4 | $Sr_2\ Al_2\ SiO_7$: Eu | 63116 |
| 5 | $Ba_2\ Al_2\ SiO_7$: Ce | 321 |
| 6 | $Ba_2\ Al_2\ SiO_7$: Eu | 43700 |
| 7 | $Sr_2\ Mg\ Si_2O_7$: Eu | 10000 |
| 8 | $Ba_2\ Mg\ Si_2O_7$: Eu | 10000 |

As shown in Table 1, it was found that particularly high luminescence intensity was brought about by the following pellet samples: the pellet samples (sample No. 3 to 4) in which Ce or Eu was doped on $Sr_2Al_2SiO_7$, and the samples (sample No. 6 to 8) in which Eu was doped on each of $Ba_2Al_2SiO_7$, $Sr_2MgSi_2O_7$, and $Ba_2MgSi_2O_7$.

EXAMPLE 3

The pellet samples of the mechanoluminescence material using the mother body material shown in Table 2 an using europium (Eu) as the luminescence center was prepared in the same manner as in Example 1, and the luminescence intensity (cps) of each pellet sample was measured. Table 2 shows results of the measurement.

TABLE 2

| MOTHER BODY COMPOSITION | LUMINESCENCE INTENSITY (cps) |
|---|---|
| (Ca, Na)(Mg, Fe, Al, Ti)(Si, Al)$_2$O$_6$ | 874 |
| (Ca, Na)$_2$(Al, Mg, Fe)(Si, Al)$_2$O$_7$ | 12000 |
| (Ca, Na$_2$)Al$_2$Si$_4$O$_{12}$ | 2490 |
| (K$_2$, Ca, Mg, Na$_2$)$_2$Al$_4$Si$_{14}$O$_{36}$ | 256 |
| (K$_2$, Sr, Mg, Na$_2$)$_2$Al$_4$Si$_{14}$O$_{36}$ | 237 |
| (Na, Ca)Al(Al, Si)$_2$SiO$_8$ | 250 |
| (Na, Sr)Al(Al, Si)$_2$SiO$_8$ | 1200 |
| (Sr, K$_2$, Na$_2$)Al$_4$Si$_{14}$O$_{36}$ | 211 |
| (Sr, Na)(Mg, Fe, Al, Ti)(Si, Al)$_2$O$_6$ | 270 |
| (Sr, Na)$_2$(Al, Mg, Fe)(Si, Al)$_2$O$_7$ | 221 |
| Ba$_2$(Mg, Al)(Al, Si)SiO$_7$ | 2356 |
| BaAl$_2$Si$_2$O$_8$ | 11600 |
| BaNaAlSi$_2$O$_7$ | 120 |
| Ca$_2$(Mg, Al)(Al, Si)SiO$_7$ | 10000 |
| CaAl$_2$SiO$_8$ | 3116 |
| CaNa$_2$Al$_4$Si$_4$O$_{16}$ | 126 |
| Sr$_2$(Mg, Al)(Al, Si)SiO$_7$ | 28501 |
| SrNa$_2$Al$_4$Si$_4$O$_{16}$ | 1564 |
| BaAl$_8$O$_{13}$ | 31320 |
| BaMgAl$_6$O$_{11}$ | 134 |
| CaMgAl$_6$O$_{11}$ | 141 |
| Ba(Zn, Mn, Fe, Mg)Si$_2$O$_6$ | 1256 |
| Ba$_2$(Mg, Fe)Si$_2$O$_7$ | 122 |
| Ba$_2$BeSi$_2$O$_7$ | 134 |
| Ca$_2$BeSi$_2$O$_7$ | 110 |
| CaMgSi$_2$O$_6$ | 341 |
| CaMnSi$_2$O$_6$ | 257 |
| CaZrSi$_2$O$_7$ | 1426 |
| Sr(Zn, Mn, Fe, Mg)Si$_2$O$_6$ | 77440 |
| Sr$_2$(Mg, Fe)Si$_2$O$_7$ | 6300 |
| Sr$_2$B$_2$SiO$_7$ | 1500 |
| Sr$_2$BeSi$_2$O$_7$ | 2851 |
| Sr$_2$MgSi$_2$O$_7$ | 10000 |
| Sr$_2$Na$_4$CeFeNb$_2$Si$_8$O$_{28}$ | 14500 |
| Sr$_3$Si$_2$O$_7$ | 158 |
| SrFeSi$_2$O$_6$ | 411 |
| SrMgSi$_2$O$_6$ | 21408 |
| Sr(Ta, Nb)$_4$O$_{11}$ | 21408 |
| SrGa$_{12}$O$_{19}$ | 128 |
| SrLaGa$_3$O$_7$ | 788 |
| ZrO$_2$ | 16280 |

As shown in Table 2, it was found that particularly high luminescence intensity was brought about by the mechanoluminescence material in which Eu was doped on each of (Ca, Na)$_2$(Al, Mg, Fe)(Si, Al)$_2$O$_7$, BaAl$_2$Si$_2$O$_8$, Cs$_2$(Mg, Al)(Al, Si)SiO$_7$, Sr$_2$(Mg, Al)(Al, Si)SiO$_7$, BaAl$_8$O$_{13}$, Sr(Zn, Mn, Fe, Mg)Si$_2$O$_6$, Sr$_2$MgSi$_2$O$_7$, Sr$_2$Na$_4$CeFeNb$_2$Si$_8$O$_{28}$, SrMgSi$_2$O$_6$, and ZrO$_2$.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A mechanoluminescence material, comprising: a mother body material; and a luminescence center added to the mother body material, wherein:
    said mother body material is constituted of at least one kind of oxide selected from:
    aluminate having a structure indicated by a general formula (B)

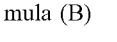

($M^2$ in the formula is Ca or Ba, and a part thereof may be replaced with either Mg or La, and each of x and y is 1 or more);

silicate having a structure indicated by a general formula (C)

$$Ba_2MgSiO_7;$$

tantalite or niobate having a structure indicated by a general formula (D)

$$xM^4O \cdot yM^5_4O_{10}$$

($M^4$ in the formula is Ca, Ba or Sr, and $M^5$ is replaced with at least one kind selected from Ta and Nb, and each of x and y is 1 or more); and gallium oxide having a structure indicated by a general formula (E)

$$xM^6O \cdot yGa_2O_3$$

($M^6$ in the formula is Ca, Ba or Sr, and a part thereof may be replaced with La, and each of x and y is 1 or more); and said luminescence center is at least one kind selected from (i) a rare earth metal of at least one kind selected from Sc, Y, La, Pr, Nd, Pm, Sm, Gd, Tb, Dy, Ho, Er, Tm, Yb, and Lu, and (ii) a transition metal of at least one kind selected from Ti, Zr, V, Cr, Mn, Fe, Co, Ni, Cu, Zn, Nb, Mo, Ta, and W.

2. The mechanoluminescence material as set forth in claim 1, wherein the rare earth metal and the transition metal are such that a first ionization energy is not more than 8 eV.

3. A mechanoluminescence material, comprising: a mother body material; and a luminescence center added to the mother body material, wherein:

said mother body material is alumino silicate having a structure indicated by a general formula $$xM^1O \cdot yAl_2O_3 \cdot zSiO_2$$

(M1 in the formula is Ca, Ba or Sr, and a part thereof may be replaced with at least one kind selected from Na, K, and Mg, and each of x, y, and z is 1 or more); and said luminescence center is at least one kind selected from (i) a rare earth metal of at least one kind selected from Sc, Y, La, Ce, Pr, Nd, Pm, Sm, Gd, Tb, Dy, Ho, Er, Tm, Yb, and Lu, and (ii) a transition metal of at least one kind selected from Ti, Zr, V, Cr, Mn, Fe, Co, Ni, Cu, Zn, Nb, Mo, Ta, and W.

4. A mechanoluminescence material, comprising: a mother body material; and a luminescence center added to the mother body material, wherein:

said mother body material is silicate having a structure indicated by a general formula $$xM^3O \cdot ySiO_2$$

($M^3$ in the formula is Ca or Sr, and a part thereof may be replaced with at least one kind selected from Na, Mg, Zn, Be, Mn, Zr, Ce, and Nb, and each of x and y is 1 or more); and said luminescence center is at least one kind selected from (i) a rare earth metal of at least one kind selected from Sc, Y, La, Ce, Pr, Nd, Pm, Sm, Gd, Tb, Dy, Ho, Er, Tm, Yb, and Lu, and (ii) a transition metal of at least one kind selected from Zr, V, Cr, Mn, Fe, Co, Ni, Cu, Zn, Nb, Mo, Ta, and W.

* * * * *